(12) United States Patent
Rainisto et al.

(10) Patent No.: US 7,886,233 B2
(45) Date of Patent: *Feb. 8, 2011

(54) ELECTRONIC TEXT INPUT INVOLVING WORD COMPLETION FUNCTIONALITY FOR PREDICTING WORD CANDIDATES FOR PARTIAL WORD INPUTS

(75) Inventors: Roope Rainisto, Helsinki (FI); John Hard, Malmo (SE)

(73) Assignee: Nokia Corporation, Espoo (FI)

( * ) Notice: Subject to any disclaimer, the term of this patent is extended or adjusted under 35 U.S.C. 154(b) by 1164 days.

This patent is subject to a terminal disclaimer.

(21) Appl. No.: 11/255,580

(22) Filed: Oct. 21, 2005

(65) Prior Publication Data

US 2006/0265648 A1    Nov. 23, 2006

Related U.S. Application Data

(63) Continuation-in-part of application No. 11/135,623, filed on May 23, 2005.

(51) Int. Cl.
G06F 3/048 (2006.01)
G06F 3/01 (2006.01)

(52) U.S. Cl. ...... 715/773; 715/255; 715/256; 715/261; 715/780; 715/825

(58) Field of Classification Search ............. 715/534, 715/716, 843, 255, 256, 261, 773, 780, 810, 715/825, 840; 725/37; 710/30; 348/552
See application file for complete search history.

(56) References Cited

U.S. PATENT DOCUMENTS 4,969,097 A * 11/1990 Levin ........................ 715/234
5,220,625 A * 6/1993 Hatakeyama et al. ....... 715/809
5,724,457 A * 3/1998 Fukushima ................ 382/311

5,805,159 A * 9/1998 Bertram et al. ............ 715/764

(Continued)

FOREIGN PATENT DOCUMENTS

WO    02/33527    4/2002

(Continued)

OTHER PUBLICATIONS

"eZiText® Chinese", zi corporation, www.zicorp.com/ezitextchinesehome.htm, pp. 1-3, Sep. 2005.

(Continued)

Primary Examiner—Weilun Lo
Assistant Examiner—Nicholas Augustine
(74) Attorney, Agent, or Firm—Perman & Green, LLP

(57) ABSTRACT

A text input method is described for an electronic apparatus having a user interface with text input means and a display screen. Word completion functionality is provided for predicting word candidates for partial word inputs made by the user with the text input means. The method involves receiving a partial word input from the user and deriving a set of word completion candidates using the word completion functionality. Each of the word completion candidates in the set has a prefix and a suffix, wherein the prefix corresponds to the partial word input. The method also involves presenting the suffices for at least a sub set of the word completion candidates in a predetermined area on the display screen, wherein each of the presented suffices is made selectable for the user.

19 Claims, 9 Drawing Sheets

U.S. PATENT DOCUMENTS

| | | | | |
|---|---|---|---|---|
| 5,864,340 | A * | 1/1999 | Bertram et al. | 715/780 |
| 5,953,541 | A | 9/1999 | King et al. | 395/887 |
| 5,959,629 | A * | 9/1999 | Masui | 715/808 |
| 6,002,390 | A * | 12/1999 | Masui | 345/173 |
| 6,321,158 | B1 * | 11/2001 | DeLorme et al. | 701/201 |
| 6,337,698 | B1 * | 1/2002 | Keely et al. | 715/823 |
| 7,171,353 | B2 * | 1/2007 | Trower et al. | 704/9 |
| 7,194,404 | B1 * | 3/2007 | Babst et al. | 704/9 |
| 2002/0015042 | A1 * | 2/2002 | Robotham et al. | 345/581 |
| 2002/0024506 | A1 * | 2/2002 | Flack et al. | 345/169 |
| 2002/0052900 | A1 * | 5/2002 | Freeman | 707/531 |
| 2002/0156864 | A1 * | 10/2002 | Kniest | 709/217 |
| 2004/0239681 | A1 * | 12/2004 | Robotham et al. | 345/581 |
| 2005/0012723 | A1 * | 1/2005 | Pallakoff | 345/173 |
| 2005/0195221 | A1 * | 9/2005 | Berger et al. | 345/660 |
| 2005/0223308 | A1 * | 10/2005 | Gunn et al. | 715/500 |
| 2005/0283364 | A1 * | 12/2005 | Longe et al. | 704/257 |
| 2006/0020904 | A1 * | 1/2006 | Aaltonen et al. | 715/850 |
| 2006/0026521 | A1 * | 2/2006 | Hotelling et al. | 715/702 |
| 2006/0026535 | A1 * | 2/2006 | Hotelling et al. | 715/863 |
| 2006/0026536 | A1 * | 2/2006 | Hotelling et al. | 715/863 |
| 2006/0074885 | A1 * | 4/2006 | Chiu et al. | 707/3 |
| 2006/0095842 | A1 * | 5/2006 | Lehto | 715/532 |
| 2006/0101005 | A1 * | 5/2006 | Yang et al. | 707/3 |
| 2006/0161870 | A1 * | 7/2006 | Hotelling et al. | 715/863 |
| 2006/0161871 | A1 * | 7/2006 | Hotelling et al. | 715/863 |
| 2006/0274051 | A1 * | 12/2006 | Longe et al. | 345/173 |
| 2007/0263007 | A1 * | 11/2007 | Robotham et al. | 345/581 |

FOREIGN PATENT DOCUMENTS

| | | |
|---|---|---|
| WO | 02/19143 | 5/2002 |
| WO | 2004/079557 | 9/2004 |

OTHER PUBLICATIONS

Pocket PC OS, Microsoft Corporation, Public Product, Sep. 2005.
Ezi Tap, Zi Corporation, Public Product, Sep. 2005.
International Search Report dated Oct. 12, 2010.
European Office Action dated Aug. 4, 2010.

* cited by examiner

ELECTRONIC TEXT INPUT INVOLVING WORD COMPLETION FUNCTIONALITY FOR PREDICTING WORD CANDIDATES FOR PARTIAL WORD INPUTS

CROSS-REFERENCE TO RELATED APPLICATIONS

This application is a Continuation-in-Part of U.S. patent application Ser. No. 11/135,623 filed on May 23, 2005.

FIELD OF THE INVENTION

The present invention generally relates to electronic equipment capable of text input, and more particularly to a text input method for an electronic apparatus having a user interface with text input means and a display screen, wherein word completion functionality is provided for predicting word candidates for partial word inputs made by said user employing said text input means. The invention is also related to an electronic apparatus of this kind, and to an associated computer program product.

BACKGROUND OF THE INVENTION

Some apparatuses with touch-sensitive display screens provide a virtual keyboard feature in the user interface to facilitate text input. This works by displaying a virtual keyboard, often resembling a real-life keyboard, on the display screen. By tapping with a writing tool on individual buttons or keys of the virtual keyboard, the user may input successive characters which aggregate to a text input shown in a text input field on the display screen. Other apparatuses with touch-sensitive display screens instead, or additionally, provide handwriting recognition functionality. Such functionality typically involves detecting a hand-written input, made by the user by writing with a stylus or other writing tool on the surface of the touch-sensitive display screen, and interpreting the hand-written input as a symbol among a set of possible symbols in a predefined symbol set.

Since text input with a writing tool on a touch-sensitive display screen by nature will be slower than manual input on a hardware (physical) keyboard, it is generally desired to improve the input speed. One of the most popular approaches in this regard is the provision of word completion functionality in the user interface for automatic presentation of full word candidates to what the user has currently inputted in the form of a partial word.

For instance, if the user writes "wo" by tapping on the "w" key and then the "o" key of the virtual keyboard, the word completion functionality can predict full word candidates such as "word", "world" and "wormhole" and present them on the display screen in a selectable manner. A desired one of these candidates may be selected by the user by tapping on it, and the full word thus selected will automatically replace the current partial word input on the display screen. In the example above, the eight-character word "wormhole" may be input by a total of only three taps with the writing tool (two for inputting "w" and "o", and one for selecting the "wormhole" candidate"), therefore saving precious taps and improving on the text input speed.

While word completion functionality certainly has its benefits, some problems are associated therewith. In more particular, since the apparatus involved will typically be a small portable device such as a mobile terminal or a pocket computer, the available display screen space will be a limited resource. Thus, displaying multiple full word candidates anywhere in the user interface may potentially block other relevant information to be displayed (such as actual application contents), whereas if a dedicated area is reserved for the word completion functionality, less area will be available for presentation of other information.

A first prior art approach is illustrated in FIG. 9. A current text input 104 has been made by tapping with a writing tool on a virtual keyboard 110 and is shown in a text input field 102 of a touch-sensitive display screen. The current text input 104 consists of three complete words ("The Oxford English") and a current partial word 106 ("Dic"). The cursor position is indicated at 107. In FIG. 9, the word completion functionality has derived a set of predicted full word candidates 109. The candidates all have the partial input 106 as prefix. The full word candidates 109 are presented in a vertical list in a pop-up window 108 which may have a dynamic size and/or location.

A second prior art approach is illustrated in FIG. 10. Here, a set of predicted full word candidates 109', as derived by the word completion functionality, is shown horizontally candidate by candidate in a dedicated area 108' between the virtual keyboard 110 and the text input field 102.

SUMMARY OF THE INVENTION

In view of the above, an objective of the invention is to solve or at least reduce the problems discussed above. More specifically, the invention aims at providing word completion functionality in a manner which reduces or even eliminates the risk of blocking or otherwise interfering with other information on the display screen, such as application contents, and also saves display screen space. Another objective is to perform presentation of word completion candidates at a consistent display screen location which is intuitive to the user and facilitates efficient text input. Still an objective is to reduce the number of manual input steps required by a user for inputting a particular word.

Generally, the above objectives and purposes are achieved by a text input method, an electronic apparatus and a computer program product according to the attached independent patent claims.

A first aspect of the invention is a text input method for an electronic apparatus having a user interface with text input means and a display screen, wherein word completion functionality is provided for predicting word candidates for partial word inputs made by said user employing said text input means, the method involving:

receiving a partial word input from said user;

deriving a set of word completion candidates using said word completion functionality, each of the word completion candidates in said set having a prefix and a suffix, wherein the prefix corresponds to said partial word input; and presenting the suffices for at least a sub set of the word completion candidates in a predetermined area on said display screen, wherein each of the presented suffices is made selectable for said user.

Advantageously, also the prefix that corresponds to said partial word input is presented in said predetermined area.

By presenting only the suffices for the candidates, and not the entire full words that they represent, considerable display screen space may be saved. In turn, saving display screen space means a reduced risk of blocking or otherwise interfering with other information on the display screen. For instance, if the partial word is "compl", displaying "ete", "etion" and "ex" versus "complete", "completion" and "complex" takes a lot less space. Mentally repeating "compl" several times is unnecessary. In the mental process of writing a word the user has the whole word in his or her mind, and therefore selecting just a suffix like "etion" is not difficult in practice.

In one embodiment, where the display screen is touch-sensitive and said text input means includes a virtual keyboard which is presentable on said touch-sensitive display screen, said step of receiving a partial word input from said user involves detecting successive actuations, by said user using a writing tool, of virtual keys of said virtual keyboard which accumulate into said partial word input.

In this or another embodiment, the display screen is again touch-sensitive, and said text input means includes handwriting recognition (HWR) functionality for interpreting a handwritten input, made by said user with a writing tool on said touch-sensitive display screen, into at least one symbol among a set of possible symbols in a predefined symbol set, so as to generate said partial word input.

In one embodiment, a particular presented suffix may belong to a full word completion candidate, i.e. a candidate that represents a full word, made up by the candidate's prefix and suffix, in a currently active language for said word completion functionality.

Moreover, in this or another embodiment, a particular presented suffix may belong to an incomplete word completion candidate, i.e. a candidate that represents an incomplete word in the currently active language for said word completion functionality. In this case, the prefix of a particular word completion candidate corresponds to a first portion of a full word in a currently active language for said word completion functionality, whereas the presented suffix of said particular word completion candidate corresponds to a second portion of said full word, following after said prefix and being followed in said full word by at least a third portion of said full word, wherein said step of presenting involves presenting the second portion but not the third portion.

The second portion may advantageously be a syllable or other practically sized segment of said full word.

The existence of said third portion of said full word is advantageously indicated to said user by adding a visually recognizable indication to the presented second portion of said full word.

For such an incomplete word completion candidate, the method may further involve:

detecting selection by said user of the presented suffix for said particular word completion candidate;

appending the selected suffix to said partial word input; and repeating said steps of deriving and presenting for the thus appended partial word input, consisting now of the first and second portions of said full word.

Embodiments that allow a presented suffix to belong to an incomplete word completion candidate have a particular advantage in that they will make a large number of word completion candidates available for selection by the user with a limited number of manual selection steps.

The method according to any of the embodiments referred to above may advantageously involve the steps of receiving an additional character input made by said user employing said text input means;

appending said additional character input to said partial word input; and repeating said steps of deriving and presenting for the thus appended partial word input.

This will allow the user to continue inputting one or more additional characters manually, in case none of the presented suffices is what he is looking for. Once the one or more additional characters have been received, the presented set of suffices will be updated dynamically to reflect word completion candidates that now match the appended partial word input.

In one embodiment, the suffices for all of the word completion candidates in the derived set are presented in the predetermined area—i.e., the word completion functionality will derive the exact number of word completion candidates, the suffices of which are to be presented and made selectable. In another embodiment, though, the word completion functionality may derive more word completion candidates than can be presented at the same time in the predetermined area. In such a case, some principle of selection may be applied as regards which of these suffices that are to be presented, as will be explained in more detail in the following.

A typical number of suffices presented in the predetermined area may range from 2 to 4, but other values are also possible.

In an advantageous embodiment, the predetermined area is located within or at said virtual keyboard on said display screen. Advantageously, the prefix is shown first, followed by each presented suffix in successive order horizontally from left to right on said display screen.

Even more advantageously, the predetermined area is located within, or on top of, a space bar included in the virtual keyboard. This is in fact a very logical and consistent positioning of word completion candidates on the display screen. A word is completed by tapping the space bar, so displaying word completion candidates in the same area as the space bar allows a more consistent mechanic movement pattern for the hand of the user. In turn, this will improve on the user's text input speed.

Advantageously, the space bar, and therefore the predetermined area, is located at one edge of the display screen. Positioning the candidates in this way at the edge of the display screen makes efficient use of Fitt's law, which states that tapping (selecting) items at a display screen edge is much easier and more effective than elsewhere on the display screen.

The text input method may involve the steps of detecting selection by said user of one of the presented suffices; and for the selected suffix, replacing a presentation of said partial word on said display screen with a presentation of the word completion candidate to which the suffix belongs.

Advantageously, after said step of replacing a presentation, the presented suffices are removed from presentation in the predetermined area. Moreover, the presented suffices may be removed from presentation in the predetermined area upon detecting selection by said user of said space bar, the user thereby indicating that the current text input is a complete word.

In other words, word completion candidates will only be shown in the predetermined area during such times when it is relevant to do so, and during other times the space bar may be used solely for inputting space characters. In one embodiment, if the current partial word which has been input by the user contains less than a certain number of characters, such as two, no suffices will be shown in the predetermined area. Thus, in this embodiment, single-character candidates are not displayed; a candidate needs to have at least two characters in order to be displayed to the user. This conforms well to the general purpose of a virtual keypad with word completion functionality, namely to reduce the amount of key taps—tapping single character candidates obviously does not fulfill that purpose.

In this document, a "writing tool" is an object suitable for interaction with a touch-sensitive display so as to input text in the manner described. Thus, a "writing tool" may be a stylus, pen, a user's finger or any other physical object suitable for such interaction with the touch-sensitive display.

Preferably, the predetermined area only overlaps a predefined maximum part of the space bar, the maximum part being such that a sufficient area of the space bar is left available for convenient selection by said user.

The extent of the sufficient area that is deemed enough for convenient selection of the space bar, even when the predetermined area is used to the maximum for presentation of suffices, will of course have to be decided for each actual implementation. However, at least an area corresponding to a certain number of characters, such as 2, of typical size is presently believed to be appropriate to leave unoccupied for convenient selection of the space bar.

The text input method may involve the step of selecting, among the set of word completion candidates derived by the word completion functionality, candidates to be included in said sub set for presentation in a way such that shorter suffices are favored over longer suffices, thereby allowing a larger number of suffices to be presented in the predetermined area. For instance, suffices containing only two or three characters may be favored over ones that contain four or more characters. In this way, it may be possible to include e.g. 4 shorter suffices in the presented sub set, rather that just 2 or 3 longer ones. Alternatively, if no such favoring is applied, it may be necessary sometimes to reduce the number of suffices presented in the predetermined area, so that the permitted maximum part that overlaps the space bar is not exceeded. Another alternative would be to truncate the suffices, at least the longer ones, so that only the leading characters thereof are presented to represent the suffix in question.

A second aspect of the invention is an electronic apparatus having a user interface with text input means and a display screen, and a controller coupled to said display screen, the user interface including word completion functionality for predicting word candidates for partial word inputs made by said user employing said text input means, the controller being adapted for performing the steps of:

receiving a partial word input from said user;

deriving a set of word completion candidates using said word completion functionality, each of the word completion candidates in said set having a prefix and a suffix, wherein the prefix corresponds to said partial word input; and presenting the suffices for at least a sub set of the word completion candidates in a predetermined area on said display screen, wherein each of the presented suffices is made selectable for said user.

The electronic apparatus may for instance be a mobile terminal for a mobile telecommunications system, such as GSM, UMTS, D-AMPS or CDMA2000, or a portable/personal digital assistant (PDA), a pocket computer, or another type of similar apparatus.

A third aspect of the invention is a computer program product directly loadable into a memory of a processor, where the computer program product comprises program code for performing the method according to the first aspect when executed by said processor.

The second and third aspects mat generally have the same or corresponding features and advantages as the first aspect.

Other objectives, features and advantages of the present invention will appear from the following detailed disclosure, from the attached dependent claims as well as from the drawings.

BRIEF DESCRIPTION OF THE DRAWINGS

Embodiments of the present invention will now be described in more detail, reference being made to the enclosed drawings.

DETAILED DESCRIPTION OF THE INVENTION

Figure 1:
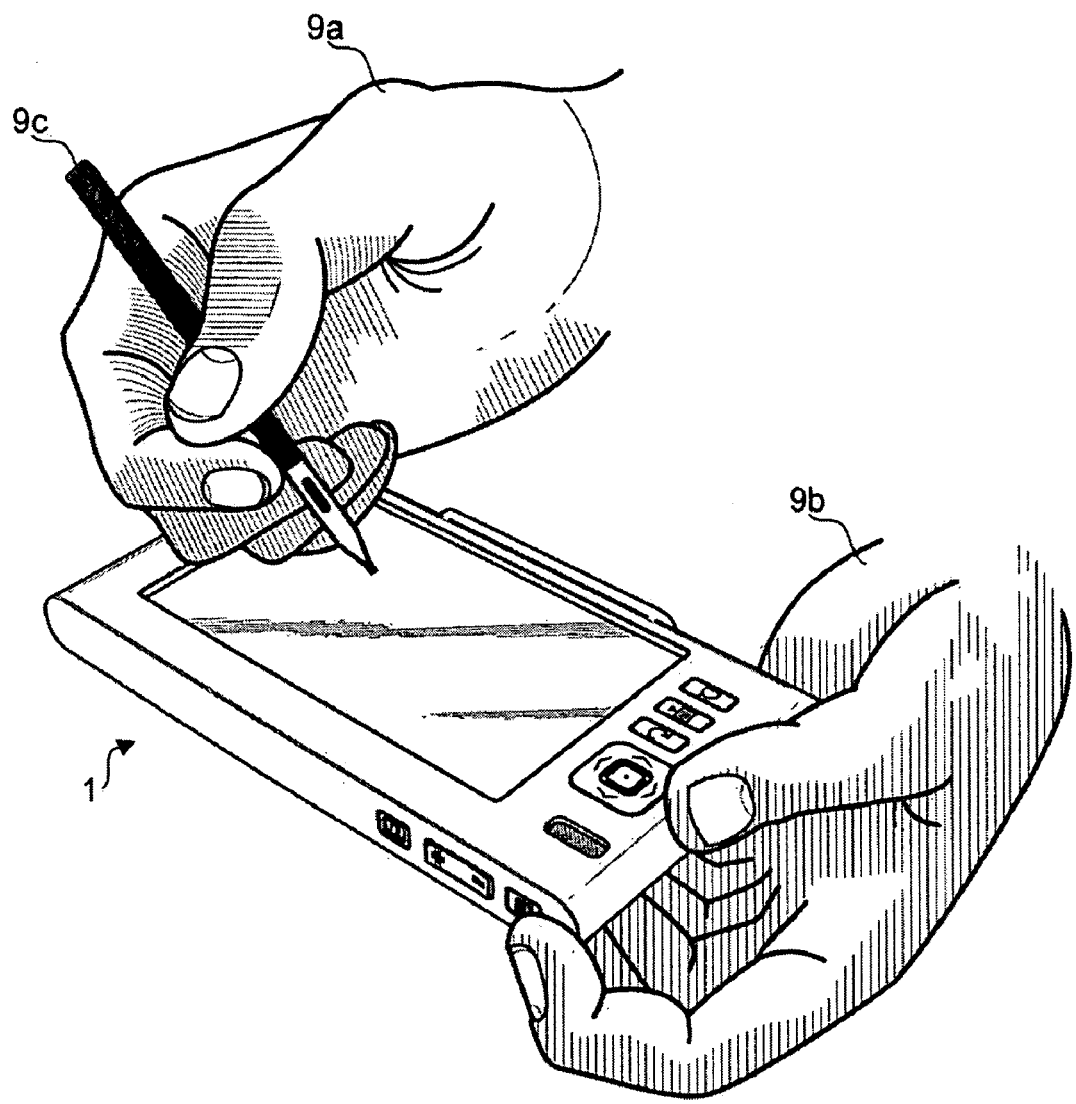
FIG. 1 is a perspective view of an electronic apparatus according to one embodiment, in the form of a pocket computer which is shown in a typical operating position in the hands of a user.

The pocket computer 1 of the illustrated embodiment comprises an apparatus housing 2 and a relatively large touch-sensitive display screen 3 provided at a front side $2_f$ of the apparatus housing 2. Next to the display screen 3 a plurality of hardware keys 5a-d are provided, as well as a speaker 6.

More particularly, key 5a is a five-way navigation key, i.e. a key which is depressible at four different peripheral positions to command navigation in respective orthogonal directions ("up", "down", "left", "right") among information shown on the display screen 3, as well as depressible at a center position to command selection among information shown on the display screen 3. Key 5b is a cancel key, key 5c is a menu or options key, and key 5d is a home key.

In addition, a second plurality of hardware keys 4a-c are provided at a first short side $2_u$ of the apparatus housing 2. Key 4a is a power on/off key, key 4b is an increase/decrease key, and key 4c is for toggling between full-screen and normal presentation on the display screen 3.

At a second short side $2_l$ of the apparatus housing 2, opposite to said first short side $2_u$, there are provided an earphone audio terminal 7a, a mains power terminal 7b and a wire-based data interface 7c in the form of a serial USB port.

Figure 5:
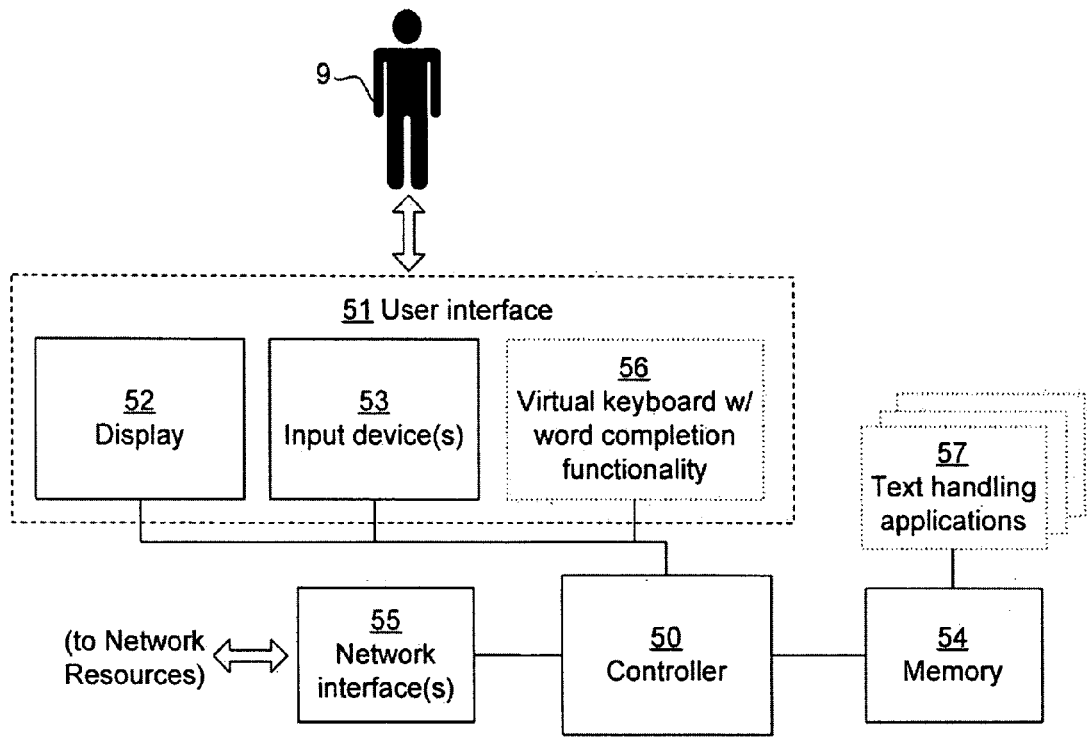
FIG. 5 is a schematic block diagram of the pocket computer according to the previous drawings.

Being touch-sensitive, the display screen 3 will act both as a visual output device 52 and as an input device 53, both of which are included in a user interface 51 to a user 9 (see FIG. 5). More specifically, as seen in FIG. 1, the user 9 may operate the pocket computer 1 by pointing/tapping/dragging with a writing tool 9c such as a stylus or pen, held in one hand 9a, on the surface of the touch-sensitive display screen 3 and/or by actuating any of the hardware keys 4a-c, 5a-d (which also are included as input devices in the user interface 51) with the thumb and index finger of the other hand 9b.

As seen in FIG. 5, the pocket computer 1 also has a controller 50 with associated memory 54. The controller is responsible for the overall operation of the pocket computer 1 and may be implemented by any commercially available CPU (Central Processing Unit), DSP (Digital Signal Processor) or any other electronic programmable logic device. The associated memory may be internal and/or external to the controller 50 and may be RAM memory, ROM memory, EEPROM memory, flash memory, hard-disk, or any combination thereof. The memory 54 is used for various purposes by the controller 50, one of them being for storing data and program instructions for various pieces of software in the pocket computer 1. The software may include a real-time operating system, drivers e.g. for the user interface 51, as well as various applications.

At least some of these applications may be text handling applications 57, for instance in the form of a notes application (further shown in FIGS. 8, 11 and 12), a messaging application (e.g. SMS, MMS, email), a contacts application, a word processing application, etc. To facilitate text input, the user interface 51 includes a virtual keyboard module 56 with word completion functionality, having the general purpose which has already been explained above. In addition to this, the user interface may include other text input means.

To allow portable use, the pocket computer 1 has a rechargeable battery. The pocket computer also has at least one interface 55 for wireless access to network resources on at least one digital network. More detailed examples of this are given in FIG. 4. Here, the pocket computer 1 may connect to a data communications network 32 by establishing a wireless link via a network access point 30, such as a WLAN (Wireless Local Area Network) router. The data communications network 32 may be a wide area network (WAN), such as Internet or some part thereof, a local area network (LAN), etc. A plurality of network resources 40-44 may be connected to the data communications network 32 and are thus made available to the user 9 through the pocket computer 1. For instance, the network resources may include servers 40 with associated contents 42 such as www data, wap data, ftp data, email data, audio data, video data, etc. The network resources may also include other end-user devices 44, such as personal computers.

Figure 4:
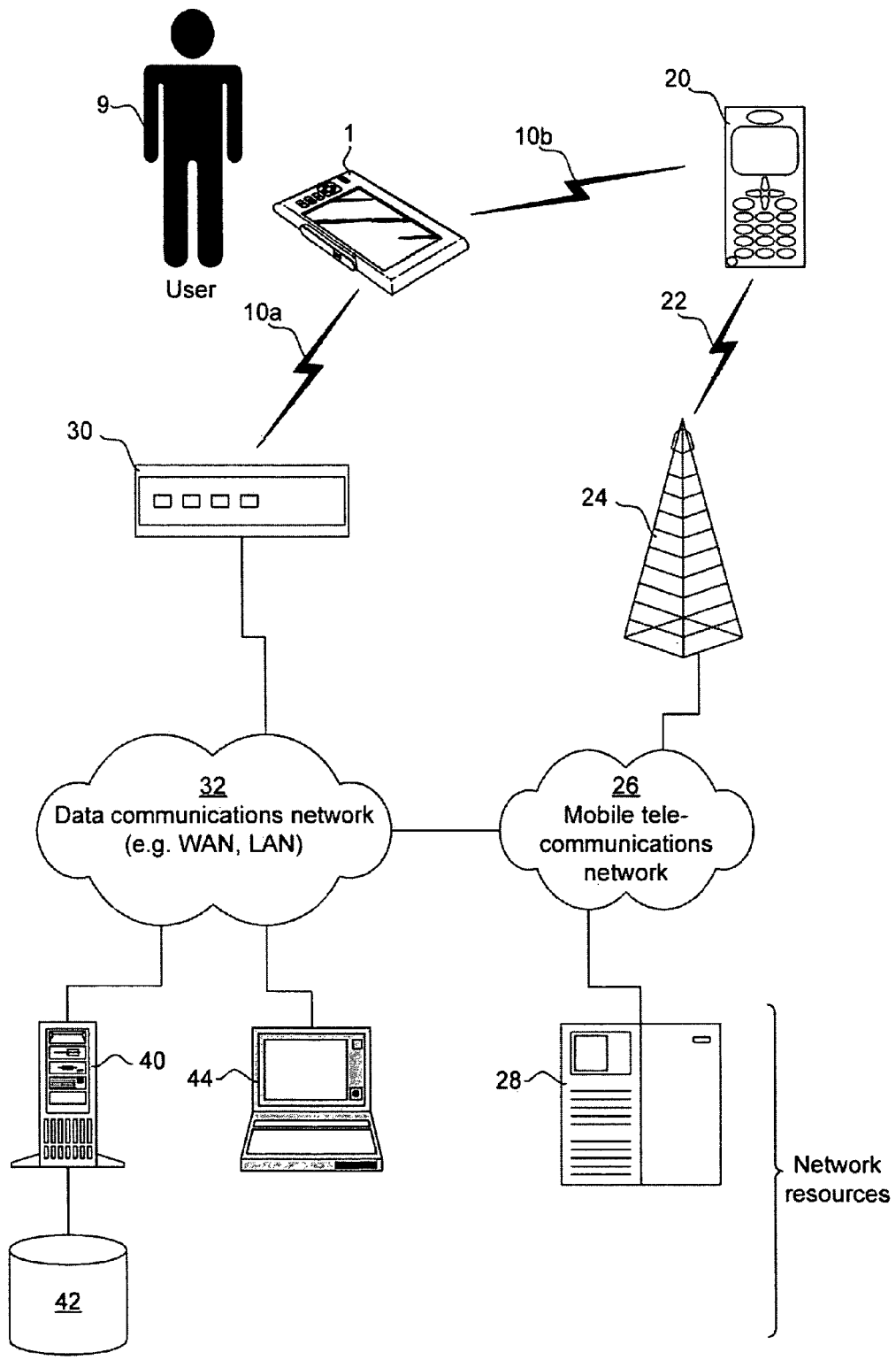
FIG. 4 illustrates a computer network environment in which the pocket computer of FIGS. 1-3 advantageously may be used for providing wireless access for the user to network resources and remote services.

A second digital network 26 is shown in FIG. 4 in the form of a mobile telecommunications network, compliant with any available mobile telecommunications standard such as GSM, UMTS, D-AMPS or CDMA2000. In the illustrated exemplifying embodiment, the user 9 may access network resources 28 on the mobile telecommunications network 26 through the pocket computer 1 by establishing a wireless link 10b to a mobile terminal 20, which in turn has operative access to the mobile telecommunications network 26 over a wireless link 22 to a base station 24, as is well known per se. The wireless links 10a, 10b may for instance be in compliance with Bluetooth, WLAN (Wireless Local Area Network, e.g. as specified in IEEE 802.11), HomeRF or HIPERLAN. Thus, the interface(s) 55 will contain all the necessary hardware and software required for establishing such links, as is readily realized by a man skilled in the art.

Figure 2:
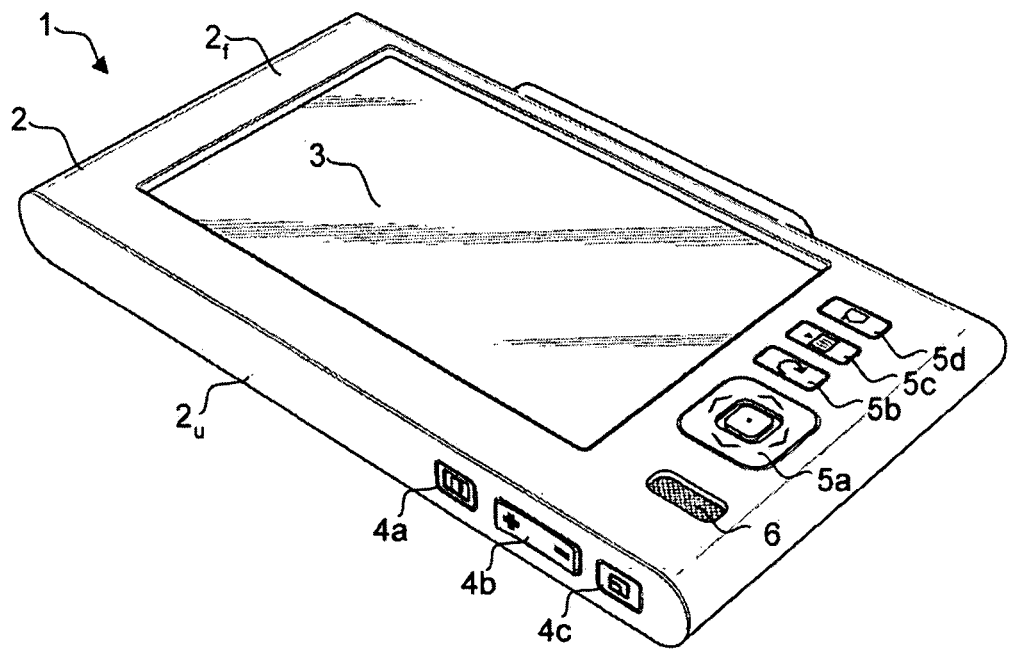
FIGS. 2 and 3 are different perspective views of the pocket computer of FIG. 1.
Figure 3:
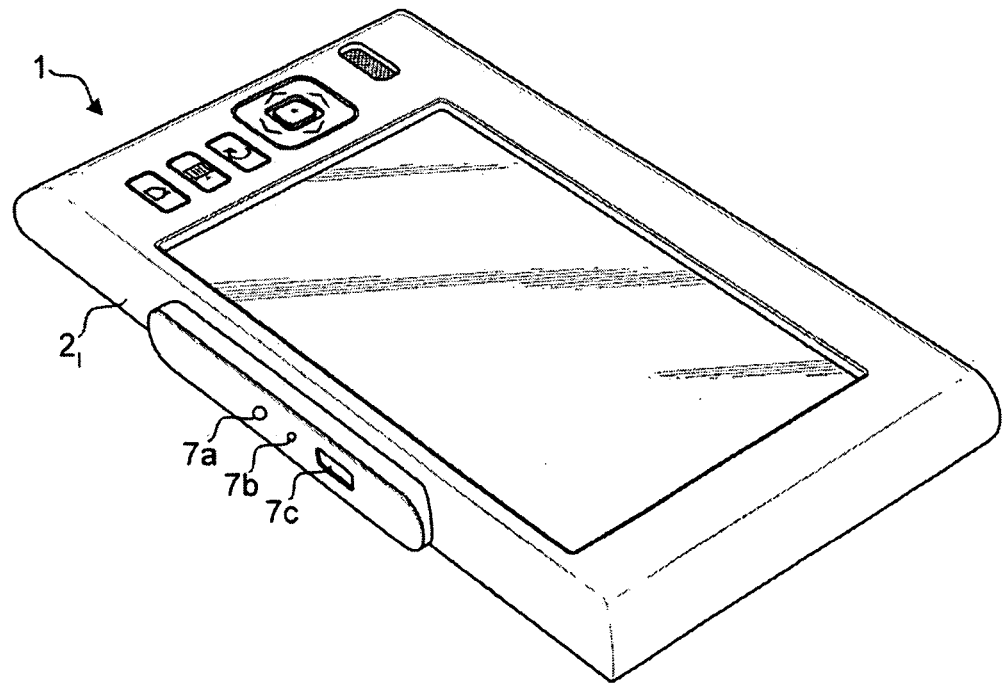
Figure 6:
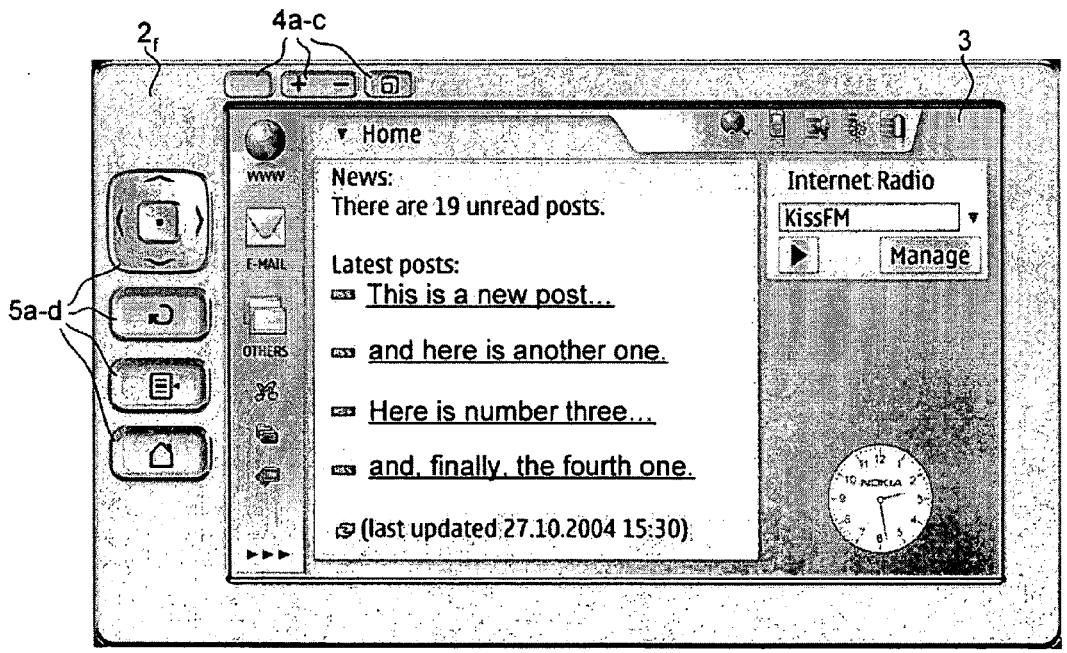
FIG. 6 is a front view of the pocket computer, demonstrating a typical display screen layout of its user interface.

FIG. 6 shows a front view of the pocket computer and indicates a typical display screen layout of its user interface. A typical disposition of the display screen layout, presenting a view of a home application (i.e., a start or base view that the user may return to whenever he likes), is shown in more detail in FIG. 7. In FIG. 6, the hardware keys 5a-d are shown at their actual location to the left of the display screen 3 on the front surface 2f of the apparatus housing 2, whereas, for clarity reasons, the hardware keys 4a-c are illustrated as being located above the display screen 3 on the front surface 2f even while they actually are located at aforesaid first short side 2u (FIG. 2).

Figure 7:
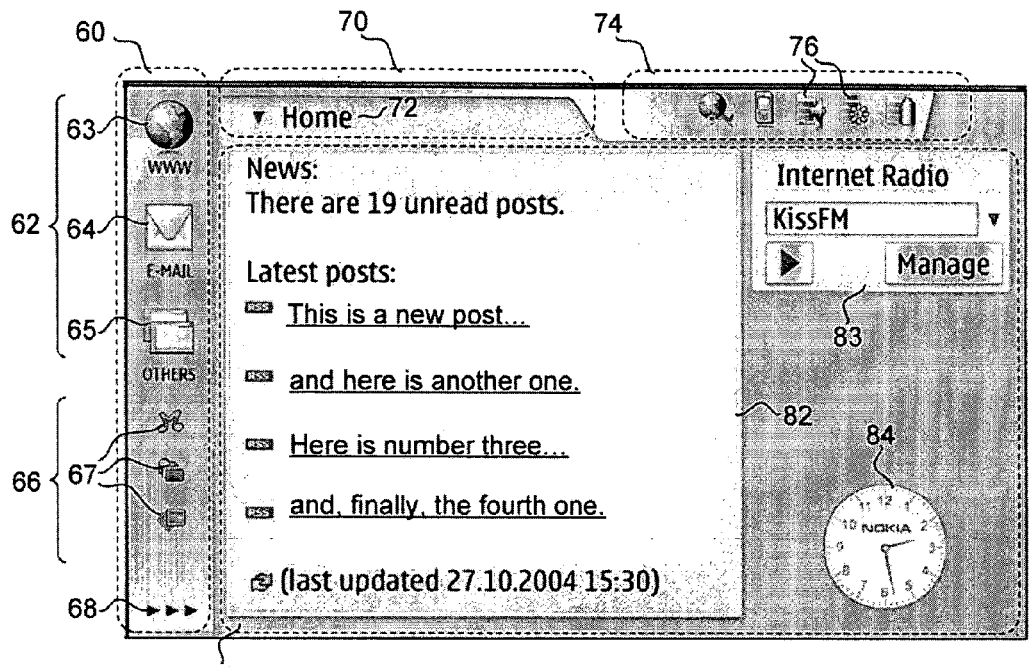
FIG. 7 illustrates a typical disposition of the display screen layout, including a home view.

With reference to FIG. 7, the layout of the display screen 3 is divided into four main areas: a task navigator 60, a title area 70, a status indicator area 74 and an application area 80.

Figure 8:
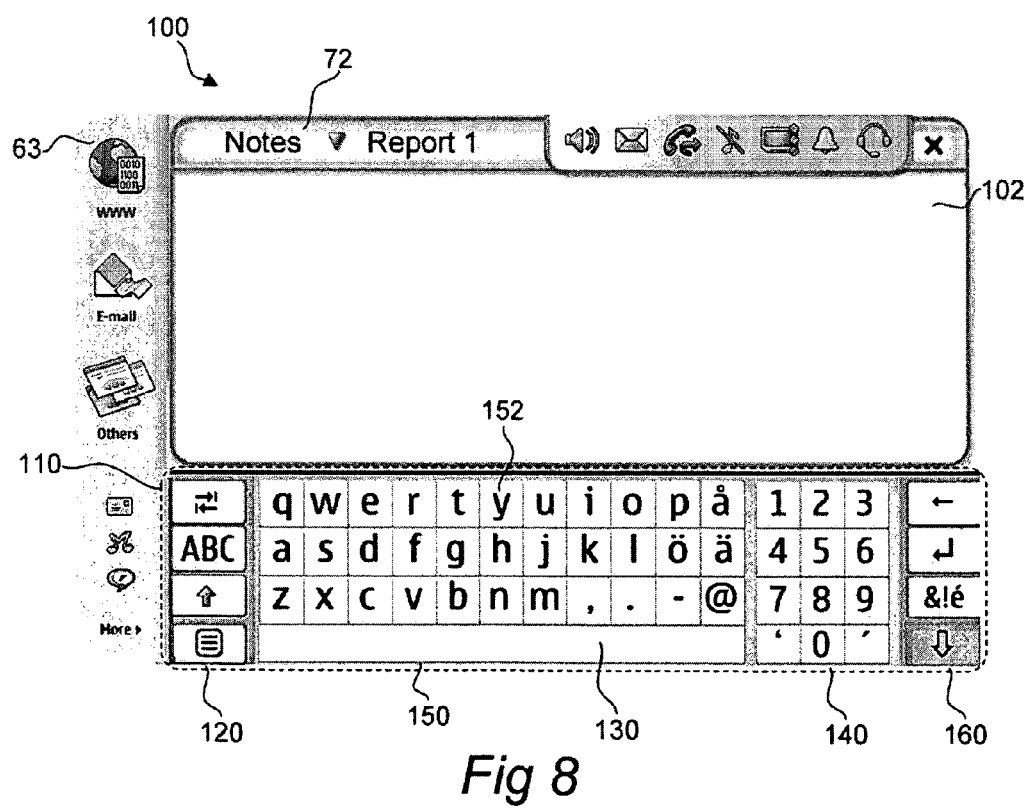
FIG. 8 illustrates a display screen layout for text input into a text handling application in the pocket computer.
Figure 9:
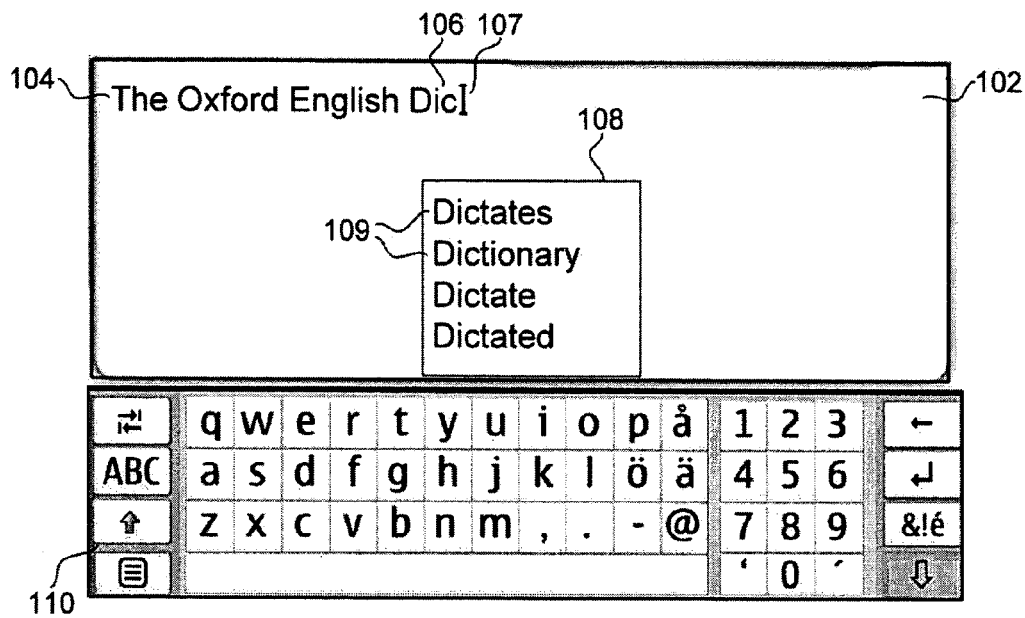
FIGS. 9 and 10 illustrate prior art approaches for word completion functionality.
Figure 10:
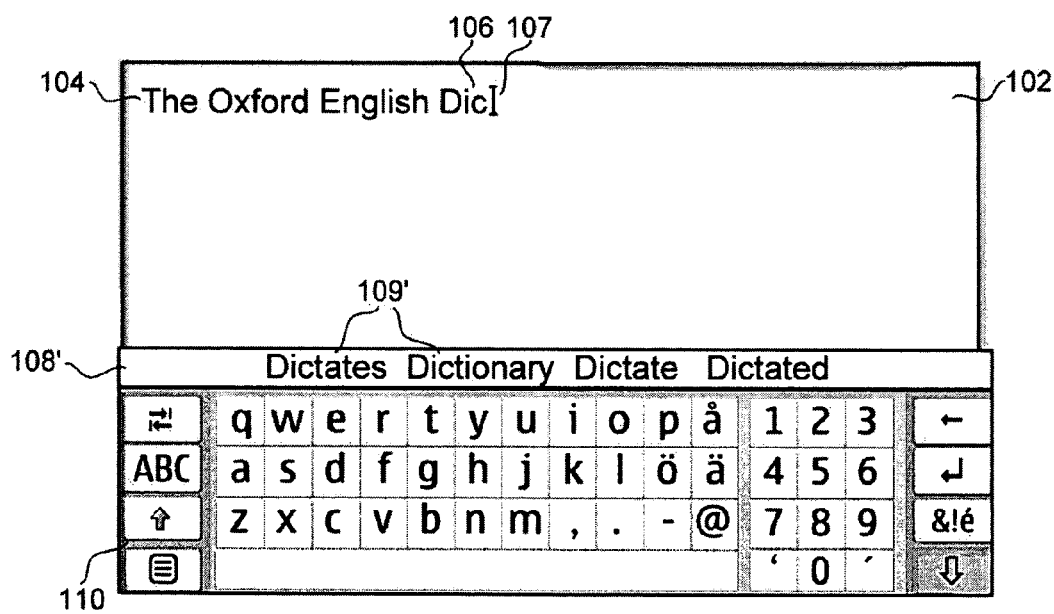

The application area 80 is used by a currently active application to present whatever information is relevant and also to provide user interface controls such as click buttons, scrollable list, check boxes, radio buttons, hyper links, etc, which allow the user to interact with the currently active application by way of the stylus 9c. One example of how a currently active application, in the form of a notes application, uses the application area 80 in this manner is shown in FIG. 8. A name or other brief description of the currently active application (e.g. the notes application) and a current file or data item (e.g. the currently open text file) is given at 72 in the title area 70 (e.g. "Notes—Report 1"). In addition, by tapping in the title area 70, the user may access a menu structure of the currently active application.

The status indicator area 74 contains a plurality of icons 76 that provide information about system events and status, typically not associated with any particular active application. As seen in FIG. 7, the icons 76 may include a battery charge indicator, a display brightness control, a volume control as well as icons that pertain to the network interface(s) 55 and the ways in which the pocket computer connects to the network(s) 32, 26.

The task navigator 60, title area 70 and status indicator area 74 always remain on screen at their respective locations, unless full screen mode is commanded by depressing the hardware key 4c. In such a case, the currently active application will use all of the display 3 and the areas 60, 70 and 80 will thus be hidden.

The task navigator 60 has an upper portion 62 and a lower portion 66. The upper portion 62 contains icons 63-65 which when selected will open a task-oriented, context-specific menu to the right of the selected icon. The context-specific menu will contain a plurality of task-oriented menu items, and the user may navigate among these menu items and select a desired one either by the navigation key 5a or by pointing at the display screen 3. As seen in FIG. 7, the lower portion 66 represents an application switcher panel with respective icons 67 for each of a plurality of launched applications.

Figure 11:
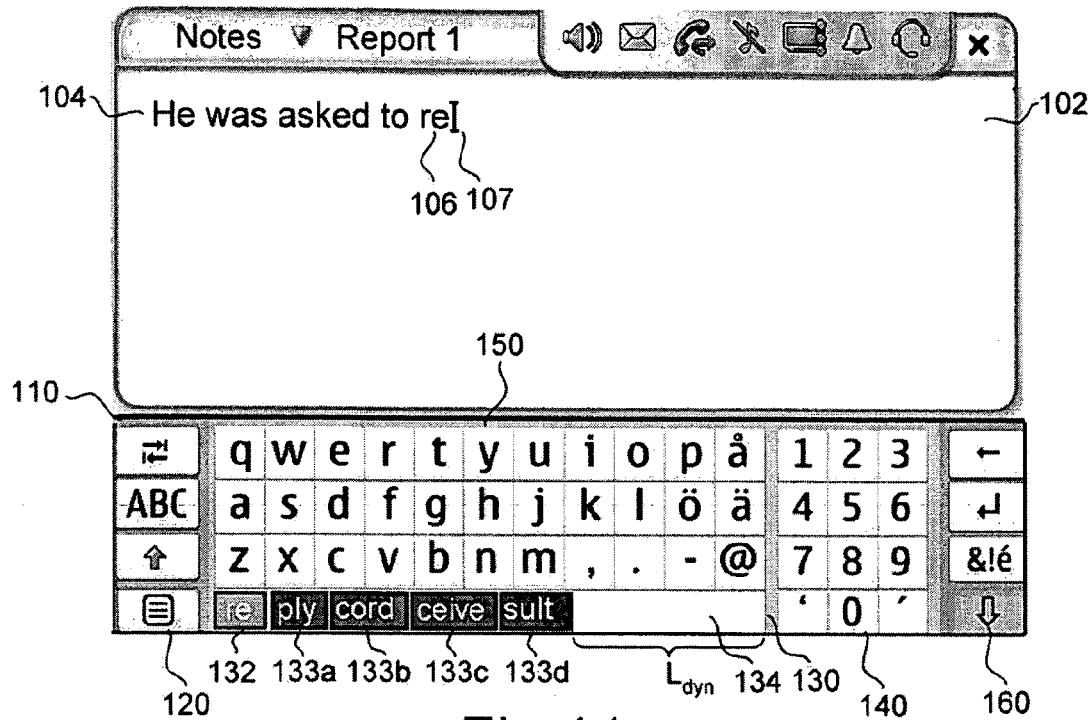
FIGS. 11 and 12 are display screen snapshots that illustrate the word completion functionality according to one embodiment, which employs a virtual keyboard as text input means.
Figure 12:
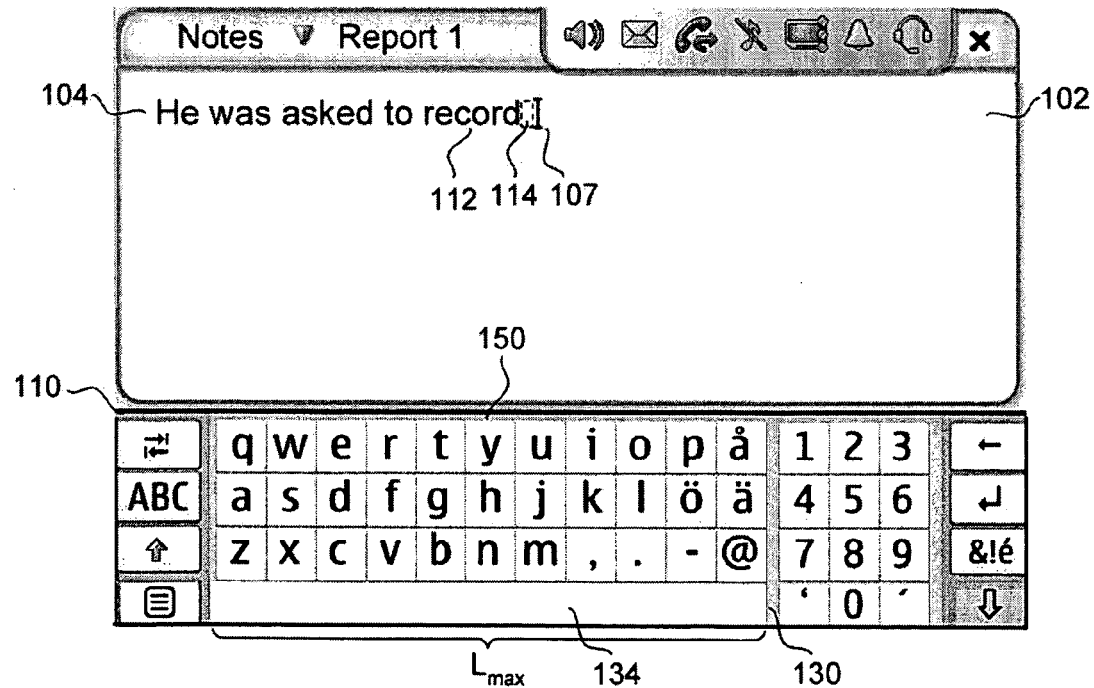

Referring now to FIGS. 8 and 11-12, the virtual keyboard module 56 with its word completion functionality will be described in more detail. As such, the word completion functionality may be implemented by any existing or future software package capable of deriving a set of full word candidates in response to a current partial word input 106 entered by the user by tapping on different keys of the virtual keyboard 110. To this end, the word completion functionality may use a dictionary stored in a database in memory 54, possibly together with statistics that reflect the frequency or likelihood of each word, or group of interrelated words, in the dictionary. The dictionary could be language-specific. The particulars of the word completion functionality as such are not a key aspect of the present invention, and no detailed description is given herein to avoid obscuring the invention in unnecessary detail. It is well within reach for the skilled practitioner to implement appropriate word completion functionality, either by designing one of his own or using a commercially available one.

In FIG. 8, a text handling application in the form of a notes application is active, as indicated at 72 in the title area 70, and has control of the application area 80 of the display screen layout 100. The application area is divided into a text input field 102 and a virtual keyboard 110. Currently, there is no text input shown in the text input field 102.

The virtual keyboard 110 is divided into four main groups of logical keys or buttons 120, 140, 150 and 160. Each such key has an activation area which is indicated as a grey box having a icon or symbol representing the meaning of the key in question. In a well known manner, by pointing with the stylus 9c within the activation area, the user 9 may select the key. Alternatively or in addition, text input may be performed by other input means, such as handwriting recognition (HWR) functionality. An embodiment that employs HWR instead of a virtual keyboard will be described in more detail later with reference to FIG. 13 and FIG. 14.

If the selected key is an alphanumeric key included in a character key group 150 or numeric key group 140, such as a "y" key 152, the corresponding alphanumeric character will be directly displayed in the text input field 102, as is well known per se. If, on the other hand, the selected key belongs to a control key group 120 or 160, a corresponding function will instead be performed, such as backspace, carriage return, tabulation, switch of character set, caps lock, etc.

In FIG. 11, the user has made a text input 104 which includes four complete words ("He", "was", "asked", "to") and one partial word input 106 ("re"). Now, the word completion functionality is called upon to derive a set of full word candidates for the partial word input. In the illustrated example in FIG. 11, the derived set of full word candidates includes the candidates "reply", "record", "receive" and "result". Contrary to the prior art, these candidates are not shown in their entirety on the display screen. Instead, the prefix 132 that corresponds to the partial word input 106 is presented together with the suffixes 133a-133d of the above-mentioned full word candidates in a predetermined area arranged on top of a space bar 130 in the character key group 150. A certain part of the activation area 134 of the space bar 130 is still left available for the user to tap with the stylus for manual selection of a space character. Thus, only a fraction ($L_{max}-L_{dyn}$) of the nominal length $L_{max}$ of the space bar 130 (see FIG. 12) is used for presentation of candidate suffixes 133a-133d.

The user 9 may now conveniently select the desired full word candidate by pointing at its suffix with the stylus. Thus, if the user selects the suffix 133b ("cord"), the associated full word candidate 112 (made up of prefix "re" and suffix "cord") will automatically replace the partial word 106 at the cursor 107 in the text input field 102, as is seen in FIG. 12. Alternatively, the suffix 133b may be appended to the partial word input 106 in the text input field to form the full word 112; the end effect will be the same: automatic completion of a partial word input into a desired and selected full word 112. Once this has taken place, the prefix 132 and the full word candidates 133a-d will be removed from presentation on top of the space bar 130, thereby again revealing all of the activation area 134 of the latter. When the text input field 102 is updated in this manner with a selected full word candidate, a trailing space character 114 may be appended automatically at the end of the full word 112.

In one embodiment, as has already been explained, the user may himself control whether or not such a trailing space character is to be added by choosing between selecting the candidate with a tapping action (stylus-down followed by stylus-up within the activation area of the candidate) or with a dragging action (stylus-down within the activation area, followed by stylus-dragging outside of the activation area and then stylus-up).

Note that the user is not obliged to select any of the presented full word candidates; if he is not happy with any of them he may keep on tapping on the various keys of the virtual keyboard 110 to keep on inputting text character by character. Each time an additional character has been added to a partial word, the word completion functionality will use this extended partial word and derive new full word candidates for presentation on top of the space bar 130. When the user has completed a word manually by tapping on different keys, he may select the space bar 130, wherein a space character will be added after the last word input and any presented full word candidates will be removed from the space bar 130.

In one embodiment the word completion functionality may be adapted to derive all possible full word candidates using said dictionary. In such a case, it is likely that the predetermined area on the space bar 130 will not be able to present the suffixes for all such possible candidates at the same time. Optionally, the suffices of the most likely candidates, as judged from aforesaid statistics, or of the first candidates in some structured order such as alphabetic, may be shown initially in the predetermined area, and the suffices of the other candidates may be made accessible by tapping a "more" element in the user interface. Upon selection of this element, a pop-up menu with more candidates may be launched somewhere on the display screen.

In one embodiment, as already explained, single-character candidates are not presented, since there will be no real saving in the amount of key taps for such candidates.

In one embodiment, the minimum length $L_{dyn}$ of the part of the space bar's activation area 134 that is left uncovered by full word candidates 133a-d corresponds to at least the length of two characters, and a maximum of four candidate suffices are shown at the same time in the predetermined area. Four suffices are believed to be efficient for the user to quickly browse and select among. In cases where the predetermined area would not fit four candidates, e.g. because of long suffices, the number of presented candidate suffices may either be reduced to three (or less), or candidates may be switched so that shorter candidate suffices will be presented instead of longer ones. Still one alternative would be to truncate candidate suffices (e.g. present only "mplet . . . " instead of "mpletion").

The invention has mainly been described above with reference to a number of embodiments. However, as is readily appreciated by a person skilled in the art, other embodiments than the ones disclosed above are equally possible within the scope of the invention, as defined by the appended patent claims. One alternative aspect of the invention involves presenting a set of full word candidates in their entirety in the predetermined area on top of the space bar. Thus, even if such an alternative aspect will not make the benefits of using candidate suffices only, it will still have all the benefits associated with presenting word completion candidates on top of the space bar, as compared to the locations where such candidates have been presented in the prior art.

Figure 13:
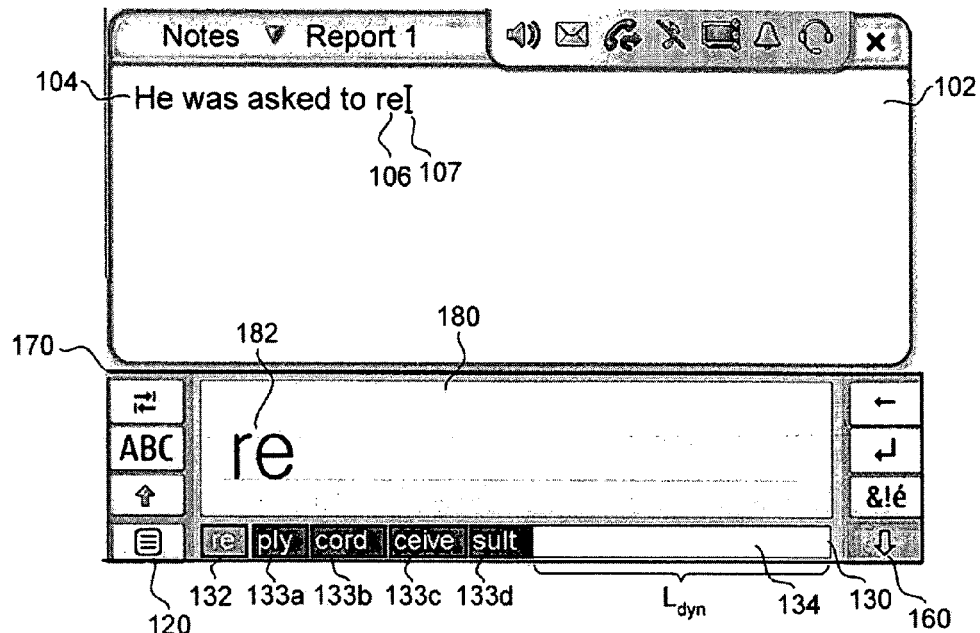
FIGS. 13 and 14 are a display screen snapshot and a schematic block diagram that illustrate word completion functionality according to an alternative embodiment, which employs handwriting recognition (HWR) functionality as text input means.
Figure 14:
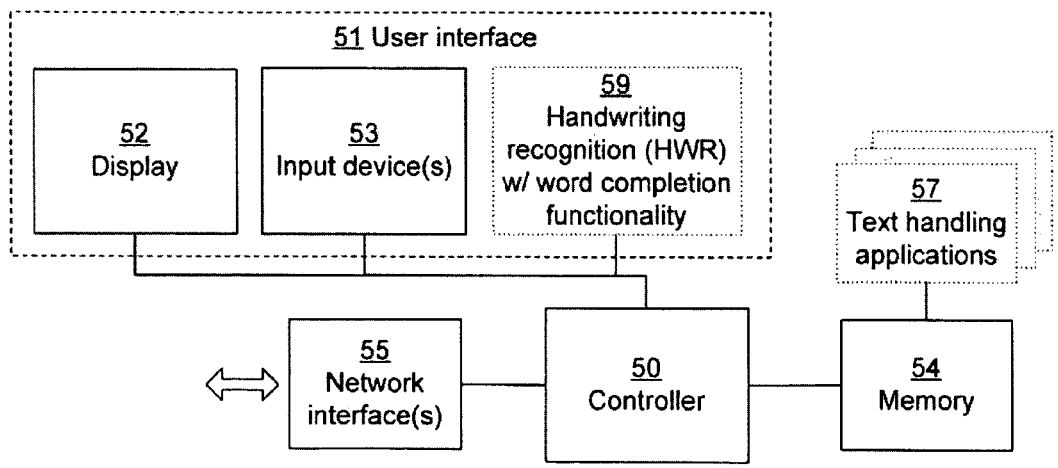

With reference to FIGS. 13 and 14, an alternative embodiment will now be described which employs handwriting recognition (HWR) functionality instead of a virtual keyboard as text input means. FIG. 14 illustrates the typical main components of such an embodiment. Except for the following, the elements of this embodiment are the same as, or equivalent to, the elements of the embodiment previously described with reference to FIG. 5. Therefore, identical reference numerals have been used in FIG. 14 and in FIG. 5 to represent such same or equivalent elements. Correspondingly, identical reference numerals have been used in FIG. 13 and in FIG. 11 to represent same or equivalent elements in the display screen snapshots shown therein.

The user interface 51 of the alternative embodiment includes a handwriting recognition (HWR) module 59 with word completion functionality, instead of (or in addition to) the virtual keyboard module 56 of FIG. 5. As is known per se in the art, handwriting recognition typically involves detecting a hand-written input, made by a human user by writing with a stylus or other writing tool on the surface of a touch-sensitive display screen, and interpreting the hand-written input as a symbol among a set of possible symbols in a predefined symbol set.

In the situation shown in FIG. 13, the user has thus made a text input 104 which includes four complete words ("He", "was", "asked", "to") and one partial word input 106 ("re"). More specifically, the partial word input 106 has been handwritten, character by character, by the user in a handwriting input area 180, which is provided as part of a handwriting palette 170 in the lower region of the touch-sensitive display screen, and has been interpreted by the handwriting recognition functionality in the HWR module 59 as representing the individual characters "r" and "e", respectively. Upon successful interpretation, the characters are shown as typographic letters 182, instead of the original free-hand version as drawn by the user.

Now, the word completion functionality of the HWR module 59 is called upon, like in the corresponding situation previously described for FIG. 11, to derive a set of full word candidates for the partial word input. As seen in FIG. 13, the derived set of full word candidates includes the candidates "reply", "record", "receive" and "result".

As with FIG. 11, these candidates are not shown in their entirety on the display screen; instead, the prefix 132 that corresponds to the partial word input 106 is presented together with the suffixes 133a-133d of the full word candidates in the predetermined area on top of the space bar 130. The desired full word candidate is thus made available for selection by the user by pointing at its suffix with the stylus.

Figure 15:
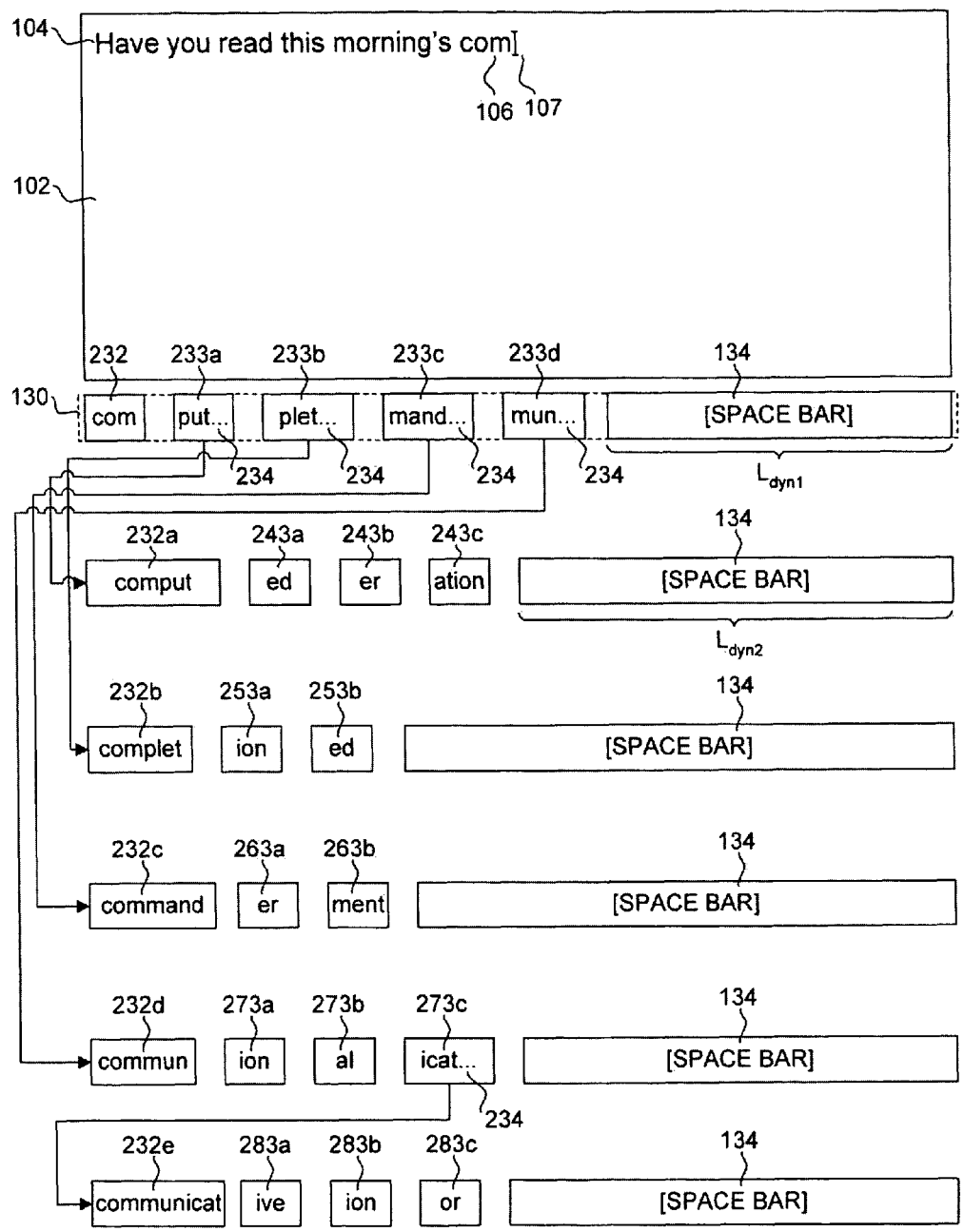
FIG. 15 illustrates word completion functionality according to yet an alternative embodiment.

FIG. 15 illustrates word completion functionality according to yet an alternative embodiment. Like reference numerals represent the same or equivalent elements as in the previously described embodiments. This embodiment may advantageously include a virtual keyboard, for instance like the virtual keyboard 110 of the embodiment shown in FIG. 11 and FIG. 12. As an alternative, it may use another kind of text input means, such as the handwriting recognition (HWR) functionality described above for the embodiment of FIG. 13 and FIG. 14. It is assumed for the rest of the exemplifying description of this embodiment that it indeed includes a virtual keyboard 110, even if only the spacebar 130 thereof is actually visible in FIG. 15.

Operationally, the embodiment of FIG. 15 differs from the previously described ones in that each of the suffixes 233a-d that are derived for an entered prefix 232, and that are presented for selection in the spacebar 130, does not necessarily represent a full word completion candidate in the sense that the prefix 132 plus a suffix (e.g. 233a) would equal a full word. Rather, all or some of the suffixes 233a-d may represent only a portion of a full word candidate, advantageously a syllable of such a full word candidate. This will make a large number of word completion candidates conveniently available to the user with a low number of selecting actions, even if only a few characters have been entered for a desired long word that has many characters and therefore also has many potential full word candidates. The following example will explain the approach and its benefits further:

Starting with the situation which is illustrated at the top of FIG. 15, it is assumed that the user has entered a partial sentence 104, reading "Have you read this morning's com", on the virtual keyboard (probably, of course, making use of the word completion functionality). The partial sentence 104 is shown in the text input field 102 of the touch-sensitive display screen. For the last, incomplete input 106, "com", the word completion functionality derives a set of word completion candidates which all have "com" as prefix in the currently active language, which is English. As is well known, many English words starts with "com", and the potential set of word completion candidates may contain many candidates, particularly far too many to be presented all at once within the spacebar 130.

The word completion functionality therefore divides the potential word completion candidates into word portions, such as syllables or other practical segments. The first portion of all the candidates will be the same, namely the prefix "com". The second portion of each candidate may however be different between different candidates. Groups of candidates may have the same second word portion but different third portions, and so on.

For instance, continuing with the example, a first group of word completion candidates 233a for the entered partial input 232 may be ones that have the syllable "put" as second word portion, following the prefix (first word portion) "com". A second candidate group 233b has the syllable "plet" as second word portion, a third group 233c has "mand", and a fourth group 233d has "mun". These four groups 233a-d are presented in the spacebar 130, essentially like the suffixes 133a-133d of FIGS. 11 and 13, and are made available for selection by the user. Thus, the presented suffixes 233a-d in this embodiment need not always represent a full word completion candidate (forming a complete word when appended to the prefix), but only a syllable or other practically sized segment of it.

The fact that a presented suffix does not represent a full word completion candidate in this sense, but an incomplete one, is indicated to the user by adding a visual indication 234 next to the suffix. In FIG. 15, this indication 234 has the form of three dots " . . . ".

Selection of such an incomplete candidate will cause the word completion functionality to append the selected suffix, such as 233a, to the current prefix 232, as is shown at 232a in FIG. 15, and derive a new set of word completion candidates having as their prefix the thus appended prefix consisting of the original prefix 232 plus the selected suffix 233a (i.e. new prefix="com"+"put"="comput"). A candidate in the new set may represent a full word completion candidate, i.e. have a suffix that when appended to the new prefix forms a full word like in the previous embodiments, or it may again represent an incomplete one. In FIG. 15, all three word completion candidates 243a-c for the new prefix 232 represent full word completion candidates, as is seen by the absence of " . . . " therein.

However, if the user instead would have selected the suffix 233d, "mun", for the original prefix 232, "com", two of the new candidates for that case would be full word completion candidates, namely 273a and 273b, whereas the third one, 273c, would be incomplete. If the incomplete candidate 273c is selected, further word completion candidates 283a-c would be presented, as is seen at the lowermost part of FIG. 15.

As is seen in FIG. 15, the part 134 of the space bar 130, that is still left available for the user to tap with the stylus for manual selection of a space character, will of course vary in length ($L_{dyn1}$, $L_{dyn2}$) depending on the number and lengths of the currently presented suffices.

Of course, full word completion candidates could appear already at the uppermost level in FIG. 15, i.e. for the original prefix 232. One example is "pact" for the prefix "com".

Advantageously, not only the prefix and the suffices are updated on the display screen upon selection of a particular suffix, but also the incomplete text input 106 at the cursor 107 in the text input field 102.

It is to be noted that the user is not obliged to make use of the presented suffices 233a-d, etc. At all times during the text input, he may also choose to enter characters manually by way of the text input means (for instance virtual keyboard). In the example above, if after having entered the partial word input 106 ("com") he manually enters an additional "m", the word completion functionality will immediately derive a new set of word completion candidates, all having the prefix "comm" in common, and present the suffices thereof for selection by the user at his will.

The word completion functionality of this embodiment consequently operates by making available for selection a hierarchical structure of word portions acting as potential suffices of a current prefix for word completion purposes, where an individual suffix can represent a full word completion candidate or an incomplete word completion candidate, depending on whether or not that suffix is followed by at least one additional word portion in the full word associated with the word completion candidate in question, and where the set of suffices that are presented for selection are dynamically updated, when the user either selects a currently presented suffix, or enters additional character(s) manually.

The invention claimed is:

1. A text input method for an electronic apparatus having a user interface with text input means and a display screen, wherein word completion functionality is provided for predicting word candidates for partial word inputs made by a user employing said text input means, wherein said display screen is touch-sensitive and said text input means includes a virtual keyboard which is presentable on said touch-sensitive display screen, the method involving:
   receiving a partial word input from said user;
   deriving a set of word completion candidates using said word completion functionality, each of the word completion candidates in said set having a prefix and a suffix, wherein the prefix corresponds to said partial word input; and
   presenting the suffixes for at least a sub set of the word completion candidates in a predetermined area located within or at said virtual keyboard on said display screen, wherein each of the presented suffixes is made selectable for said user, said step of receiving a partial word input from said user involving detecting successive actuations, by said user, of virtual keys of said virtual keyboard which accumulate into said partial word input, and wherein said predetermined area is located entirely within a space bar included in said virtual keyboard wherein each of the presented suffixes is made selectable for said user.

2. A text input method as defined in claim 1, wherein said display screen is touch-sensitive and said text input means includes handwriting recognition (HWR) functionality for interpreting a hand-written input, made by said user on said touch-sensitive display screen, into at least one symbol among a set of possible symbols in a predefined symbol set, so as to generate said partial word input.

3. A text input method as defined in claim 1, wherein a particular presented suffix belongs to a full word completion candidate representing a full word, made up by the candidate's prefix and suffix, in a currently active language for said word completion functionality.

4. A text input method as defined in claim 1, wherein the prefix of a particular word completion candidate corresponds to a first portion of a full word in a currently active language for said word completion functionality, the presented suffix of said particular word completion candidate corresponds to a second portion of said full word, following after said prefix and being followed in said full word by at least a third portion of said full word, and wherein said step of presenting involves presenting the second portion but not the third portion.

5. A text input method as defined in claim 4, involving the steps of
   detecting selection by said user of the presented suffix for said particular word completion candidate;
   appending the selected suffix to said partial word input; and
   repeating said steps of deriving and presenting for the thus appended partial word input, consisting now of the first and second portions of said full word.

6. A text input method as defined in claim 4, wherein said second portion is a syllable of said full word.

7. A text input method as defined in claim 1, involving the steps of
   receiving an additional character input made by said user employing said text input means;
   appending said additional character input to said partial word input; and
   repeating said steps of deriving and presenting for the thus appended partial word input.

8. A text input method as defined in claim 1, involving the step of presenting also the prefix that corresponds to said partial word input in said predetermined area.

9. A text input method as defined in claim 8, wherein the prefix is shown first, followed by each presented suffix in a successive order on said display screen.

10. A text input method as defined in claim 1, involving the steps of
   detecting selection by said user of one of the presented suffixes; and
   for the selected suffix, replacing a presentation of said partial word on said display screen with a presentation of the word completion candidate to which the suffix belongs.

11. A text input method as defined in claim 10, involving the further step, after said step of replacing a presentation, of removing the presented suffixes from presentation in said predetermined area.

12. A text input method as defined in claim 1, wherein all presented suffixes contain at least two characters.

13. A text input method as defined in claim 10, wherein said predetermined area only overlaps a predefined maximum part of the space bar, the maximum part being such that a sufficient area of the space bar is left available for convenient selection by said user.

14. A text input method as defined in claim 1, involving the step of selecting, among the set of word completion candidates derived by the word completion functionality, candidates to be included in said sub set for presentation in a way such that shorter suffixes are favored over longer suffixes, thereby allowing a larger number of suffixes to be presented in the predetermined area.

15. A text input method as defined in claim 4, wherein the existence of said third portion of said full word is indicated to said user by adding a visually recognizable indication to the presented second portion of said full word.

16. An electronic apparatus having a user interface with text input means and a display screen, and a controller coupled to said display screen, wherein said display screen is touch-sensitive and said text input means includes a virtual keyboard which is presentable on said touch-sensitive display screen, the user interface including word completion functionality for predicting word candidates for partial word inputs made by a user employing said text input means, the controller being adapted for performing the steps of:

receiving a partial word input from said user;

deriving a set of word completion candidates using said word completion functionality, each of the word completion candidates in said set having a prefix and a suffix, wherein the prefix corresponds to said partial word input; and presenting the suffixes for at least a sub set of the word completion candidates in a predetermined area located within or at said virtual keyboard on said display screen, wherein each of the presented suffixes is made selectable for said user, and said step of receiving a partial word input from said user involving detecting successive actuations, by said user, of virtual keys of said virtual keyboard which accumulate into said partial word input, and said predetermined area is located entirely within a space bar included in said virtual keyboard wherein each of the presented suffixes is made selectable for said user.

17. An electronic apparatus as in claim 16, in the form of a pocket computer.

18. An electronic apparatus as in claim 16, in the form of a mobile terminal for a mobile telecommunications network.

19. A computer program product comprising a memory configured to execute the method as defined in claim 1.

* * * * *